Aug. 26, 1924.
S. G. DOWN
1,505,949
AUTOMOTIVE CONTROL DEVICE
Filed Nov. 11, 1922
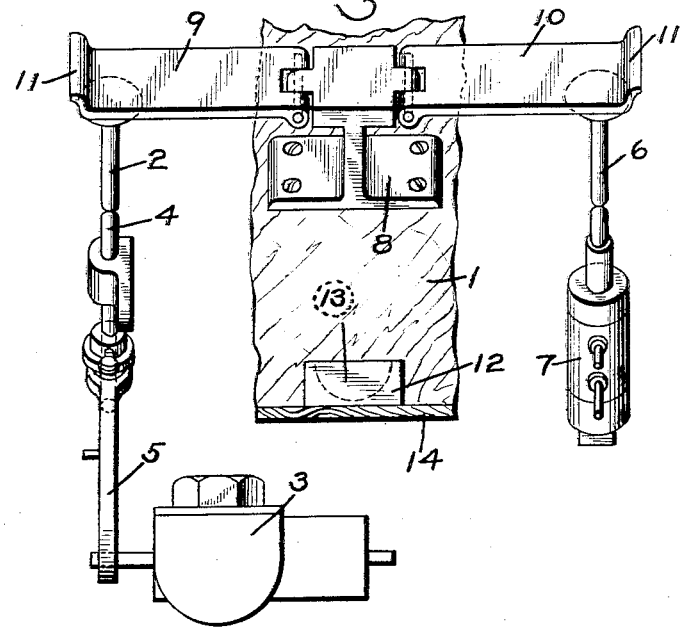
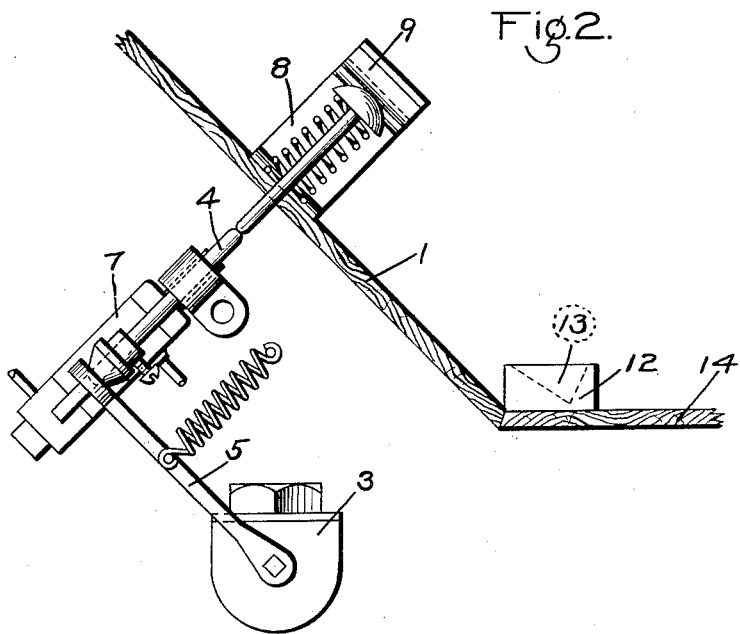
INVENTOR
SIDNEY G. DOWN
BY *Wm. M. Cady*
ATTORNEY Patented Aug. 26, 1924.

1,505,949

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE CONTROL DEVICE.

Application filed November 11, 1922. Serial No. 600,303.

*To all whom it may concern:*

Be it known that I, SIDNEY G. DOWN, a citizen of the United States, residing at Pittsburgh, in the county of Allegheny and State of Pennsylvania, have invented new and useful Improvements in Automotive Control Devices, of which the following is a specification.

This invention relates to automotive controlling devices and the principal object of my invention is to provide improved foot controlled means for controlling the acceleration and deceleration of the vehicle.

In the accompanying drawing; Fig. 1 is a front elevational view of a controlling device embodying my invention; and Fig. 2 a side elevational view thereof.

Extending through the usual inclined floor board 1 of the vehicle is a foot operable member 2 adapted to operate an accelerator, such as indicated diagrammatically by the reference numeral 3, the member 2 engaging a stem 4 operatively connected to lever 5 by which the accelerator is controlled. Also extending through the floor board 1 is a foot operable member 6 for controlling the vehicle brakes so as to decelerate the car. While any desired brake controlling means may be associated with the member 6, I have shown the member 6 arranged to operate a valve device 7 by which the brakes of the vehicle are controlled by fluid under pressure, a valve device of this character being shown in the pending application of John R. Bartholomew, Serial No. 551,713, filed April 11, 1922.

According to my invention, a bracket 8 is secured to the floor board 1 intermediate the members 2 and 6 and hinged to said bracket are foot engageable side arms 9 and 10. The side arm 9 rests upon the button portion of the member 2 and the side arm 10 rests upon the button portion of the member 6.

By simply sliding the foot laterally to one side or the other of the bracket 8, and by then depressing the foot, the corresponding control member may be operated by the movement of the cooperating side arm, as will be evident. The side arms being hinged to a rigid support, the action of the foot in depressing the operating member is steadied so as to prevent jerky movement thereof and since the arms and the bracket present a continuous surface, the foot may be readily slid back and forth to either accelerate or decelerate the vehicle, without having to lift the foot or search or feel for the particular pedal it is desired to operate.

Each arm may be provided with a flange or upturned portion 11 to prevent the foot from slipping off the end of the side arm. If desired, a heel rest 12 may be provided, having a cavity 13 for receiving the heel and secured to the horizontal floor board 14 in a position below the bracket 8.

Having now described my invention, what I claim as new and desire to secure by Letters Patent, is:—

1. In a motor vehicle controlling device, the combination with a pair of foot operable vehicle controlling members, of a bracket mounted between said members, and an arm hinged to said bracket for operating each member.

2. The combination with a depressible member for controlling the acceleration of a vehicle and a depressible member for controlling the deceleration of the vehicle, of a bracket positioned intermediate said members and arms hinged to said bracket and engaging said members, said arms being operable by the foot to depress said members.

3. The combination with a depressible member for controlling the acceleration of a vehicle and a depressible member for controlling the deceleration of the vehicle, of a bracket positioned intermediate said members and arms hinged to said bracket to present a substantially continuous surface including the face of the bracket, said arms engaging said members and being operable by the foot to depress said members.

4. The combination with a depressible member for controlling the vehicle brakes, of a fixed bracket having a face serving as a foot rest and an arm laterally hinged to said bracket and engaging said depressible member and having a face normally in the plane of said bracket face.

In testimony whereof I have hereunto set my hand,

SIDNEY G. DOWN.